(12) United States Patent
Jung et al.

(10) Patent No.: US 8,567,575 B2
(45) Date of Patent: *Oct. 29, 2013

(54) SHOCK ABSORBER HAVING SELF PUMPING UNIT

(75) Inventors: Woo Jin Jung, Iksan-si (KR); Myung Hwa Hyun, Suwon-si (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,052

(22) Filed: Nov. 16, 2011

(65) Prior Publication Data

US 2012/0055747 A1    Mar. 8, 2012

Related U.S. Application Data

(62) Division of application No. 11/985,554, filed on Nov. 15, 2007, now Pat. No. 8,100,236.

(30) Foreign Application Priority Data

Nov. 15, 2006 (KR) .................. 10-2006-0112762
Nov. 15, 2006 (KR) .................. 10-2006-0112763

(51) Int. Cl.
*F16F 9/00* (2006.01)

(52) U.S. Cl.
USPC .... 188/297; 188/315; 267/64.17; 267/DIG. 2

(58) Field of Classification Search
USPC ............... 188/297, 301, 313, 314, 315, 318, 188/322.19; 267/64.17, DIG. 1, DIG. 2
See application file for complete search history.

(56) References Cited

U.S. PATENT DOCUMENTS

| 7,021,434 | B2 * | 4/2006 | Beck ............................ 188/297 |
| 8,100,236 | B2 * | 1/2012 | Jung et al. .................... 188/297 |
| 2006/0071377 | A1 * | 4/2006 | Beck ......................... 267/64.17 |
| 2006/0197267 | A1 * | 9/2006 | Beck ......................... 267/64.16 |
| 2007/0175718 | A1 | 8/2007 | Beck |

OTHER PUBLICATIONS

United States Notice of Allowance issued in U.S. Appl. No. 11/985,554 dated Nov. 17, 2011.
United States Office Action issued in U.S. Appl. No. 13/356,382 mailed Oct. 4, 2012.

* cited by examiner

*Primary Examiner* — Bradley King
*Assistant Examiner* — Vu Q Nguyen
(74) *Attorney, Agent, or Firm* — McDermott Will & Emery LLP

(57) ABSTRACT

A shock absorber, in which external gas is sucked by movement of a piston rod to obtain compressed gas, which is used for inhibiting the "lag" phenomenon. A piston valve is connected to one end of a piston rod received in an inner shell and moved between rebound and compression strokes, an inner space of the inner shell being divided into a rebound chamber and a compression chamber by the piston valve. A reservoir chamber is provided in an outer shell outside of the inner shell to supply oil to the compression chamber in the rebound stroke and to recover oil in the compression stroke. The shock absorber has a high pressure tank with a high pressure chamber installed outside of the outer shell, and a self pumping unit for sucking gas and pumping it into the high pressure chamber using energy generated by movement of the piston rod.

5 Claims, 12 Drawing Sheets

SHOCK ABSORBER HAVING SELF PUMPING UNIT

RELATED APPLICATIONS

This application is a Divisional of U.S. application Ser. No. 11/985,554, filed on Nov. 15, 2007, claiming priority of Korean Patent Application Nos. 10-2006-0112762 and 10-2006-0112763, filed on Nov. 15, 2006, the entire contents of each of which are hereby incorporated by reference.

TECHNICAL FIELD

The present disclosure generally relates to shock absorbers, more particularly but not exclusively, to a shock absorber having a self pumping unit mounted to an outside of an outer shell and being capable of obtaining compressed gas by itself using energy generated by upward/downward movement of a piston rod, and more particularly but not exclusively, to a shock absorber, in which compressed gas obtained from the self pumping unit selectively is supplied to a reservoir chamber to inhibit or reduce a "lag" phenomenon in which negative pressure is temporarily generated below a piston valve when a compression stroke is shifted to a rebound stroke.

BACKGROUND INFORMATION

A shock absorber is installed to a vehicle body to support the weight of the vehicle body and reduce vibration transmitted from a road to the vehicle body. In addition, the shock absorber absorbs vertical vibration energy of wheels caused by irregularity of a road and the like, thereby contributing to enhancing comfort of passengers and protection of cargos and parts of a vehicle.

In general, a shock absorber comprises a cylinder connected to a wheel and a piston rod connected to a vehicle body. An interior of the cylinder is filled with oil, and the piston rod is connected to a piston valve, which is provided in the cylinder and divides the interior of the cylinder into a rebound chamber and a compression chamber. The piston valve comprises a rebound flow passage and a compression flow passage, which connect the rebound chamber and the compression chamber. When the piston valve is moved, oil passes through the aforementioned flow passages and a certain damping force is generated.

In the meantime, pressure in the compression chamber is changed when the piston valve is moved, the shock absorber has a structure for compensating the pressure in the compression chamber to cope with such pressure change. In addition, according to the structure for compensating the pressure, shock absorbers are classified into a telescope-type shock absorber having a cylinder consisting of one shell and a twin-shell type shock absorber having a cylinder with a dual structure having inner and outer shells.

In the twin-shell type shock absorber, an inner space of the inner shell is filled with oil and divided into a rebound chamber and a compression chamber by a piston valve. A reservoir chamber filled with oil is provided inside of the outer shell surrounding the inner shell. In addition, a body valve is provided at a portion at which the inner shell and the outer shell are connected to each other. The body valve is formed with a flow passage for connecting the compression chamber and the reservoir chamber. The pressure in the compression chamber of the shock absorber can be compensated by oil flowing from the reservoir chamber to the compression chamber through the flow passage when the piston valve is moved upward, i.e., in the rebound stroke of the shock absorber. When the piston valve is moved downward, i.e., in the compression stroke of the shock absorber, the body valve generates generally a damping force.

However, the conventional shock absorber has a problem in that the "lag" phenomenon is generated below the piston valve, i.e., in the compression chamber when the piston valve is moved upward due to the rebound stroke. Such a "lag" phenomenon is caused by delay of a time for which oil having flowed into the reservoir chamber by the compression stroke of the shock absorber flows from the reservoir chamber to the compression chamber when the compression stroke is shifted to the rebound stroke. This "lag" phenomenon causes a serious distortion of the damping force in the compression stroke of the shock absorber. As one scheme for preventing the "lag" phenomenon, a structure in which a cross-section of the flow passage of the body valve is enlarged has been examined. However, there is a limit to an enlargement of cross-section area of the flow passage from the reservoir chamber to the compression chamber in the body valve that requires the bidirectional flow passage and has a defined cross section area.

In addition, in the conventional shock absorber, as an operating time is lengthened, the gas pressure in the reservoir chamber drops below a certain value, so that the oil cannot be sufficiently supplied to the compression chamber in the rebound stroke, which may also cause the "lag" by which distortion of the damping force is caused.

BRIEF SUMMARY

One embodiment provides a shock absorber, in which external gas, such as air, is sucked by upward/downward movement of a piston rod to obtain compressed gas by itself and the compressed gas is used for inhibiting a "lag" phenomenon from being generated in the shock absorber.

According to an aspect of the present invention, there is provided a shock absorber, in which a piston valve is connected to one end of a piston rod received in an inner shell and moved between rebound and compression strokes, an inner space of the inner shell is divided into a rebound chamber and a compression chamber by the piston valve, and a reservoir chamber is provided in an outer shell outside of the inner shell to supply oil to the compression chamber in the rebound stroke and to recover oil in the compression stroke. The shock absorber comprises a high pressure tank provided with a high pressure chamber installed outside of the outer shell; and a self pumping unit for sucking external gas and pumping the sucked gas into the high pressure chamber using energy generated by upward/downward movement of the piston rod.

DETAILED DESCRIPTION

Figure 1:
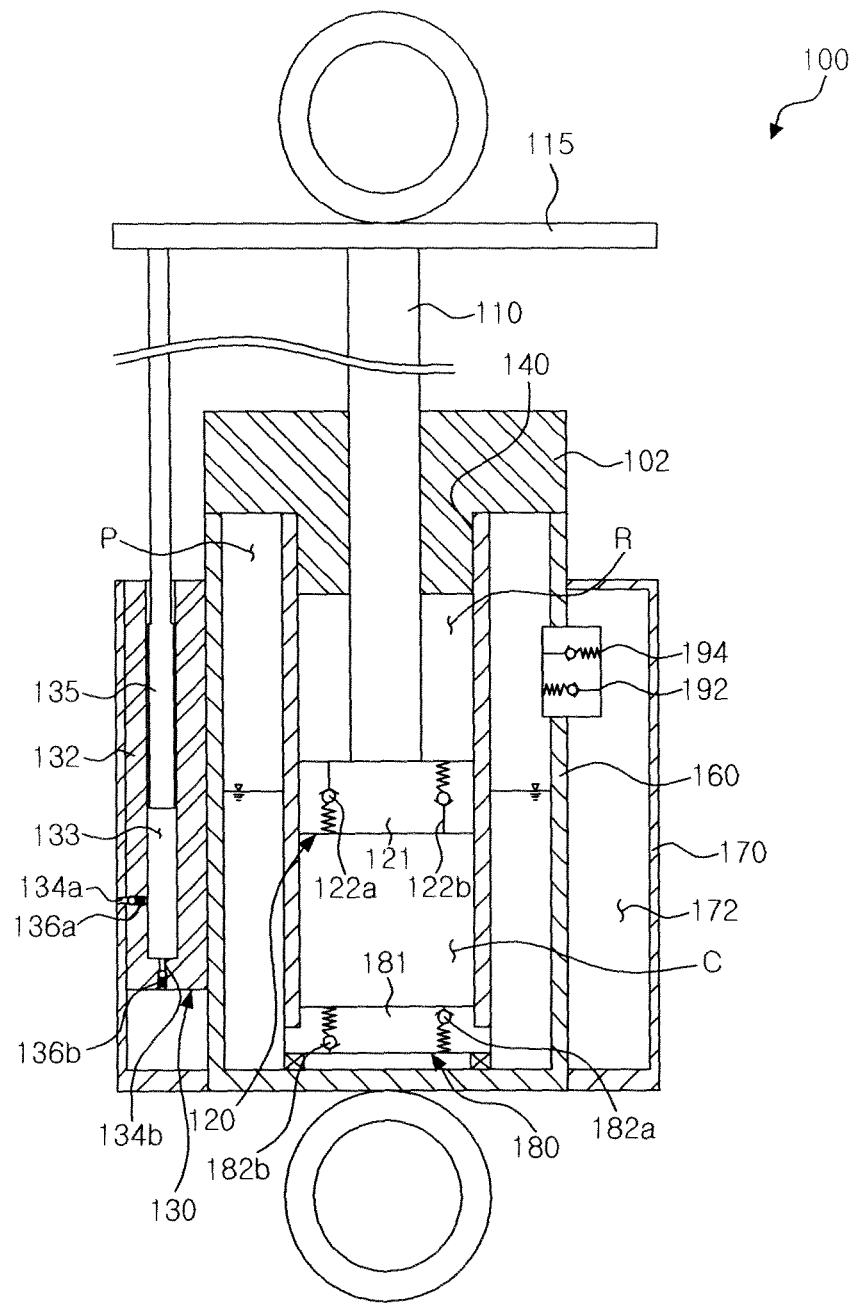
FIG. 1 is a view schematically showing a shock absorber according to a first embodiment of the present invention.

Hereinafter, preferred embodiments of the present invention will be described in more detail with reference to the accompanying drawings. In the accompanying drawings, in order to render more clearly understanding of the invention, structural elements of a shock absorber are omitted or schematically illustrated.

FIGS. 1 to 4 exemplarily illustrate a shock absorber 100 according to a first embodiment of the present invention. As shown in the figures, the shock absorber 100 according to the first embodiment comprises a piston valve 120, an inner shell 140 in which the piston valve 120 is received, and an outer shell 160 surrounding the inner shell 140. A body valve 180 is provided at a lower end of the inner shell 140 to connect the inner shell 140 and the outer shell 160. An upper rod guide 102 is installed at upper ends of the inner shell 140 and the outer shell 160, and a piston rod 110 is provided such that the piston rod can slide hermetically in the upper rod guide 102. The piston rod 110 is connected to the piston valve 120 in the inner shell 140.

The interior of the inner shell 140 is filled with oil and divided into an upper rebound chamber R and a lower compression chamber C by the piston valve 120. A reservoir chamber P, which is defined between the inner shell 140 and the outer shell 160, is filled with gas and oil that are respectively positioned in upper and lower layers. In addition, the aforementioned body valve 180 is provided between the reservoir chamber P and the compression chamber C to form a boundary between the two chambers.

The piston valve 120 comprises a valve body 121 in which a rebound flow passage and a compression flow passage are formed. In addition, the rebound flow passage and the compression flow passage are provided with a rebound valve element 122a and a compression valve element 122b that open the rebound flow passage and the compression flow passage in the directions opposite to each other according to a movement of the piston valve 120, respectively. In general, the rebound valve element 122a comprises a plurality of valve disks, which are opened and generate a predetermined damping force by oil pressure in a rebound stroke, and the compression valve element 122b comprises at least one valve disk, which is opened for allowing oil to flow from the rebound chamber to the compression chamber in a compression stroke.

When the piston valve 120 is moved upward according to the rebound stroke, the rebound valve element 122a opens the rebound flow passage by an increase of the oil pressure in the rebound chamber R. The oil passes through the opened rebound flow passage, so that the shock absorber 100 generates a certain damping force in the rebound stroke. In addition, when the piston valve 120 is moved downward according to the compression stroke, the compression valve element 122b opens the compression flow passage by an increase of the pressure in the compression chamber C, thereby allowing the oil to flow from the compression chamber C to the rebound chamber R through the opened compression flow passage.

Corresponding to the aforementioned rebound stroke and compression stroke, the body valve 180 is configured to exchange the oil between the compression chamber C and the reservoir chamber P according to the upward/downward movement of the piston valve 120. The body valve 180 comprises a valve body 181, in which first and second body flow passages are formed. The first body flow passage is closed by a first body valve element 182a. This first body valve element 182a comprises a plurality of valve disks for opening the first body flow passage according to an increase of the oil pressure in the compression chamber C caused by the compression stroke and the downward movement of the piston valve 120. At this time, the oil curvedly deforms the valve disks and passes through the first body flow passage thereby generating a certain damping force in the compression stroke of the shock absorber. In addition, the second body flow passage is closed by a second body valve element 182b comprising at least one valve disk, so that the second body valve element 182b is configured to open the second body flow passage in response to the upward movement of the piston valve 120.

In the rebound stroke, i.e., when the piston valve 120 is moved upward, the pressure below the piston valve 120, i.e., the pressure in the compression chamber C drops. As a result, the oil in the reservoir chamber P opens the second body flow passage of the body valve 180 and flows toward the compression chamber C, whereby the pressure in the compression chamber C can be compensated. However, there is significant and inevitable delay when the oil flows from the reservoir chamber P to the compression chamber C. In particular, when oil rapidly returns from the compression stroke to the rebound stroke, the above delay is further increased. Due to the above delay, a phenomenon commonly called "lag" occurs in the compression chamber C. This "lag" phenomenon causes cavitation in the compression chamber C and severe distortion of the damping force in the subsequent compression stroke.

According to one embodiment of the present invention, a high pressure tank 170 filled with high pressure gas is installed to the outside of the outer shell 160.

The shock absorber 100 according to the first embodiment comprises a self pumping unit 130 for sucking gas from the outside and pumping the sucked gas into a high pressure chamber 172 of the high pressure tank 170 to fill the high pressure chamber with gas using the kinetic energy of the piston rod 110 moved by relative motions of the vehicle body and a wheel when the shock absorber is mounted to a vehicle.

According to the first embodiment of the present invention, the high pressure chamber 172 is provided on an outer circumference surface of the outer shell 160. That is, in the first embodiment, the high pressure chamber 172 of the high pressure tank 170 is located on an outer circumference surface of the reservoir chamber P.

In the first embodiment, the self pumping unit 130 is provided with a pumping rod 135 connected to the piston rod 110 via a rod connecting member 115. The rod connecting member 115 crosses the piston rod 110 and is connected thereto. The pumping rod 135 is downward and perpendicularly connected to the rod connecting member 115, thereby being parallel to the piston rod 110, i.e., being spaced from an axial line of the piston rod in parallel.

In addition, the self pumping unit 130 comprises a pumping room 133 which slidably receives the pumping rod 135 and allows the pumping rod 135 to move reciprocatively in the pumping room 133. The pumping room 133 is formed in a pumping block 132 provided in the high pressure tank 170. Accordingly, the pumping room 133 is positioned on an outer surface of the reservoir chamber P.

Further, the self pumping unit 130 comprises first and second pumping flow passages 134a and 134b formed in the pumping block 132 so that the self pumping unit communicates with the external air and the high pressure chamber 172 of the high pressure tank 170 in a state where the self pumping unit is connected to the pumping room 133. In addition, first and second check valves 136a and 136b for pumping operation are provided in the first and second pumping flow passages 134a and 134b. The first and second check valves 136a and 136b operate according to the upward and downward movement of the pumping rod 135 in the pumping room to open the first and second pumping flow passages 134a and 134b in order.

If the piston rod 110 is moved upward in the rebound stroke of the shock absorber, the pumping rod 135 connected to the piston rod 110 is also moved upward in the pumping room 133. As a result, the pressure in the pumping room 133 becomes lower than the atmospheric pressure, so that the first check valve 136a can open the first pumping flow passage 134a. Accordingly, gas in the atmosphere is sucked into the pumping room 133 through the pumping flow passage 134a. Following the rebound stroke, if the piston rod 110 is moved downward in the compression stroke of the shock absorber, the pumping rod 135 connected to the piston rod 110 is also moved downward. Accordingly, the pressure in the pumping room 133 is increased, so that the second check valve 136b can open the second pumping flow passage 134b. Since the second pumping flow passage 134b is open, the gas sucked into the pumping room 133 in the rebound stroke is pumped into the high pressure chamber 172 of the aforementioned high pressure tank 170 so that the high pressure chamber is filled with the gas. At this time, due to the first and second check valves 136a and 136b, it is reasonable that the second pumping flow passage 134b is closed when the first pumping flow passage 134a is opened, and the first pumping flow passage 134a is closed when the second pumping flow passage 134b is closed.

Figure 2:
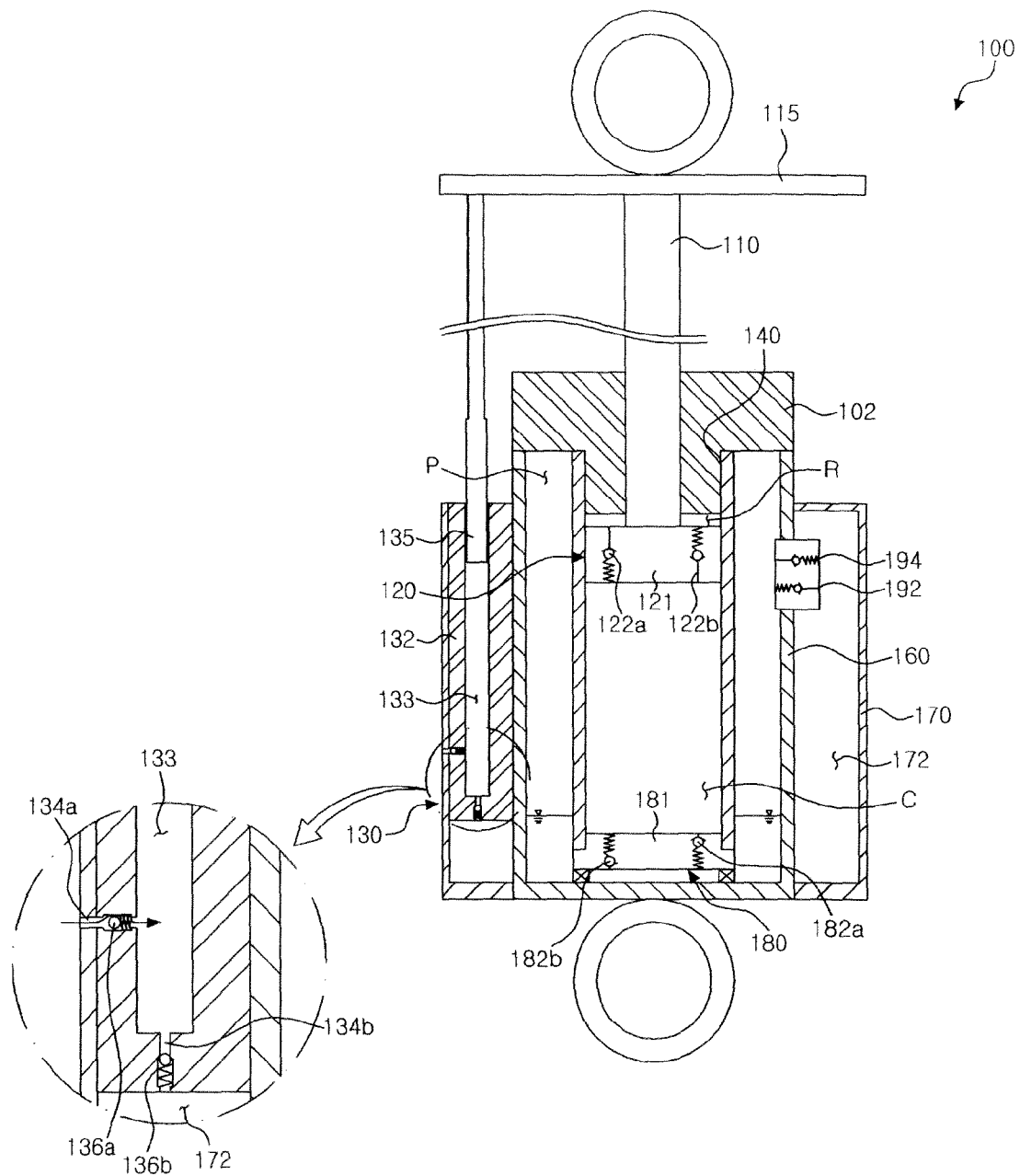
FIGS. 2 and 3 are views illustrating the operation of the shock absorber according to the first embodiment of the present invention.
Figure 3:
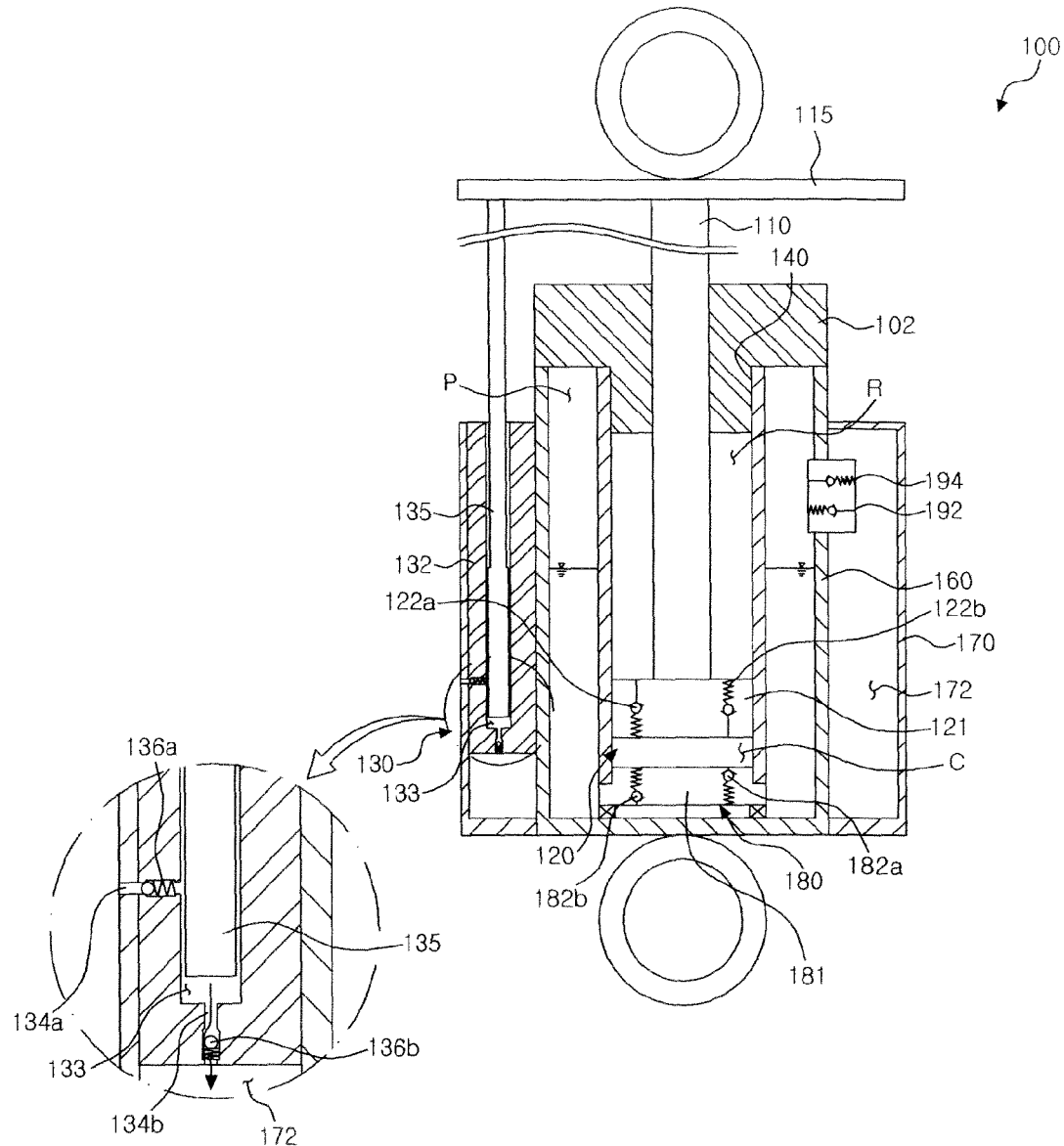

FIG. 2 is a view illustrating the operation of the self pumping unit 130 for sucking the external gas into the pumping room 133 by the upward movement of the piston rod 110 caused by the rebound stroke, and FIG. 3 is a view illustrating the operation of the self pumping unit 130 for pumping the external gas from the pumping room 133 into the high pressure chamber 172 of the high pressure tank 170 by the downward movement of the piston rod 110 caused by the compression stroke.

As shown in FIG. 2, in the rebound stroke of the shock absorber in which the pumping rod 135 is moved upward together with the piston rod 110, the pressure in the pumping room 133 that has been closed by the first and second check valves 136a and 136b is decreased below the atmosphere pressure, so that the first check valve 136a opens the first pumping flow passage 134a. Accordingly, the external gas is sucked into the pumping room 133 through the first pumping flow passage 134a. Thereafter, the compression stroke of the shock absorber occurs as shown in FIG. 3.

As shown in FIG. 3, if the pumping rod 135 is moved downward together with the piston rod 110, the pressure in the pumping room 133 in which the sucked external gas is accommodated is increased by the downward movement of the pumping rod 135, so that the second pumping flow passage 134b is opened by the second check valve 136b in a state where the first pumping flow passage 134a is closed. Accordingly, the gas sucked into the pumping room 133 is pumped and introduced into the high pressure chamber 172 of the high pressure tank 170 through the second pumping flow passage 134b.

The operations respectively illustrated in FIGS. 2 and 3 are performed repeatedly, so that the high pressure chamber 172 of the high pressure tank 170 can be filled with the compressed gas. At this time, if the pressure in the high pressure chamber 172 is higher than a certain value, the gas in the high pressure chamber is discharged to the outside. To this end, a drain valve (not shown) may be provided through which the gas in the high pressure chamber 172 can be discharged to the outside.

The shock absorber 100 is configured such that the high pressure gas stored in the high pressure chamber 172 of the high pressure tank 170 is supplied to the reservoir chamber P to supplement the reduced pressure in the reservoir chamber P when the pressure in the reservoir chamber P drops. On the contrary, the shock absorber 100 is configured such that the gas in the reservoir chamber P whose the pressure is increased by the compression stroke is recovered to the high pressure chamber 172 whose the pressure is dropped by the aforementioned gas supply. To this end, bidirectional flow passages are formed between the high pressure chamber 172 and the reservoir chamber P. These bidirectional flow passages are selectively opened and closed by first and second valve elements 192 and 194 which are bidirectional valves described in detail below. The first and second valve elements 192 and 194 selectively open the flow passage having the directionality from the high pressure chamber 172 to the reservoir chamber P and the flow passage having the directionality from the reservoir chamber P to the high pressure chamber 172.

Figure 4:
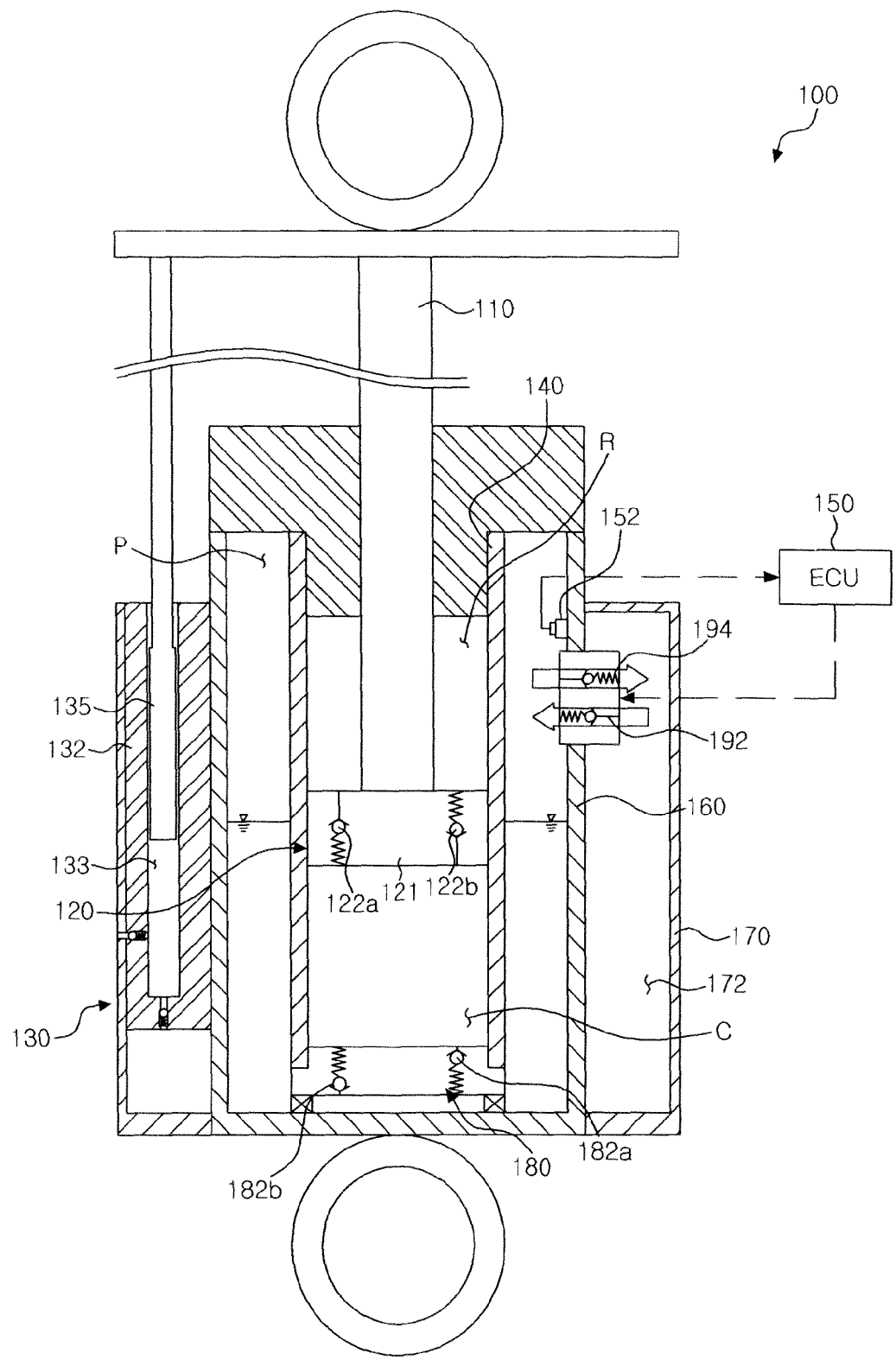
FIG. 4 is a view illustrating the control concept of the shock absorber according to the first embodiment of the present invention.
Figure 5:
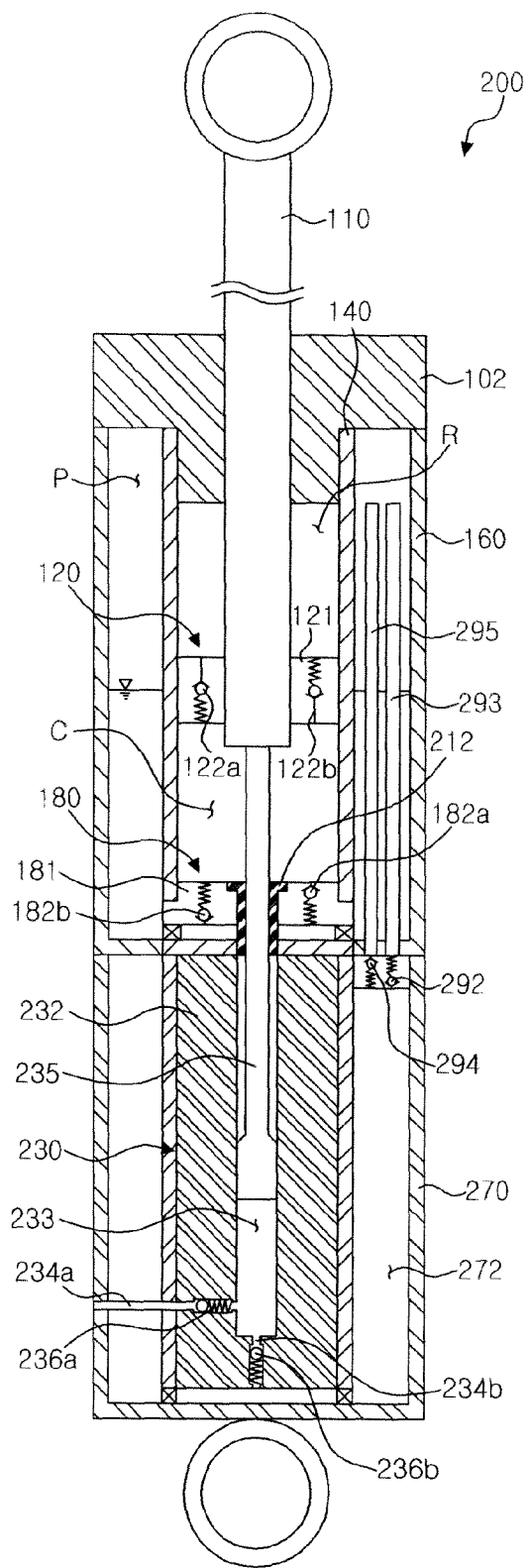
FIG. 5 is a view schematically showing a shock absorber according to a second embodiment of the present invention.
Figure 6:
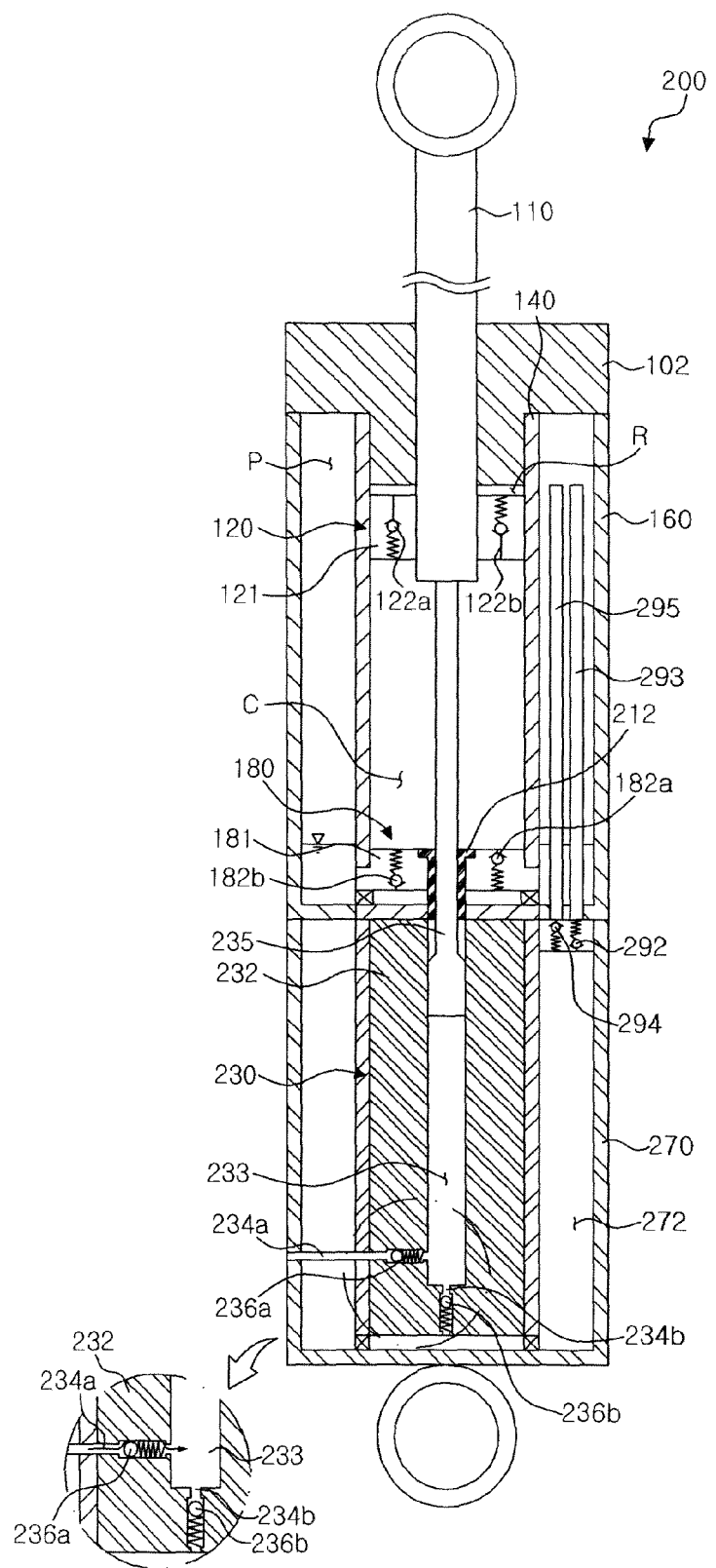
FIGS. 6 and 7 are views illustrating the operation of the shock absorber according to the second embodiment of the present invention.
Figure 7:
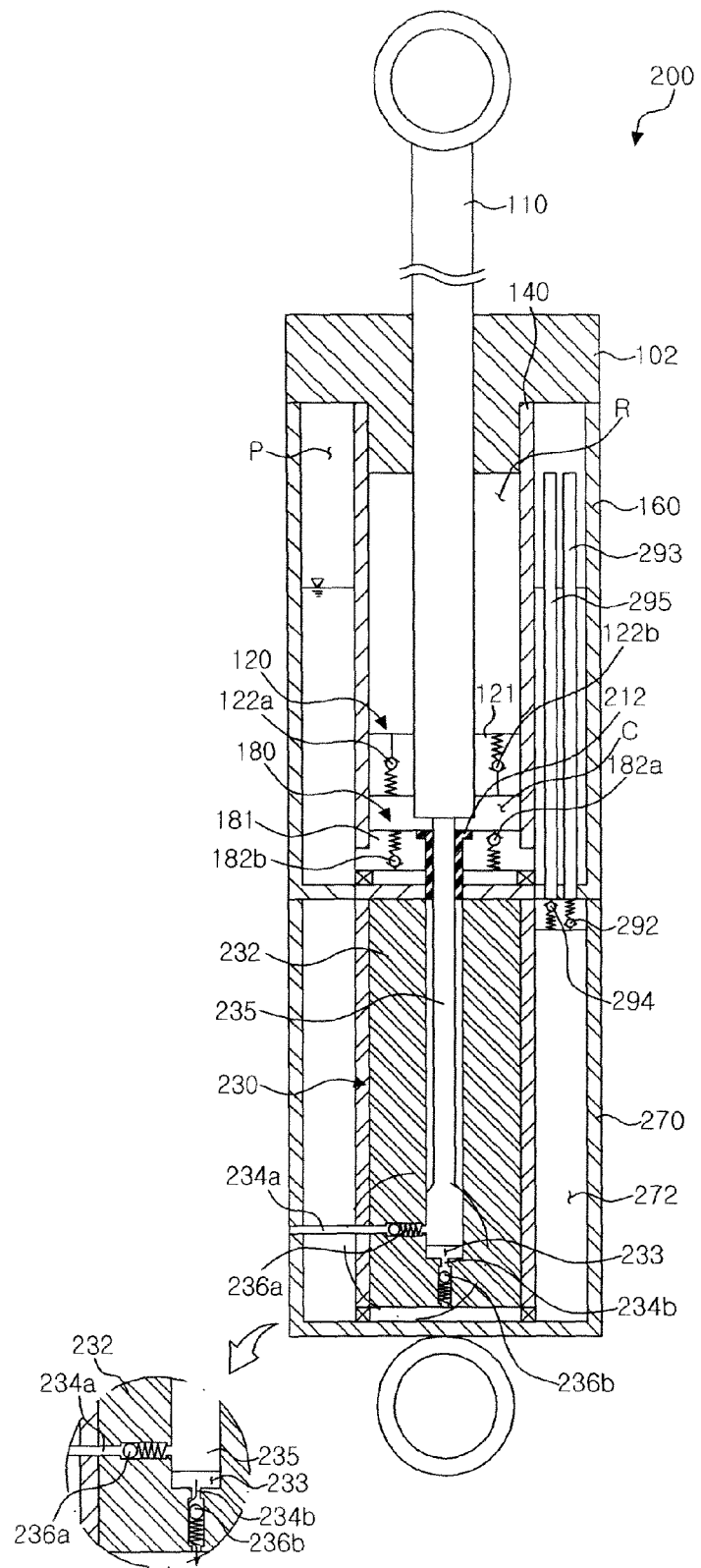
Figure 8:
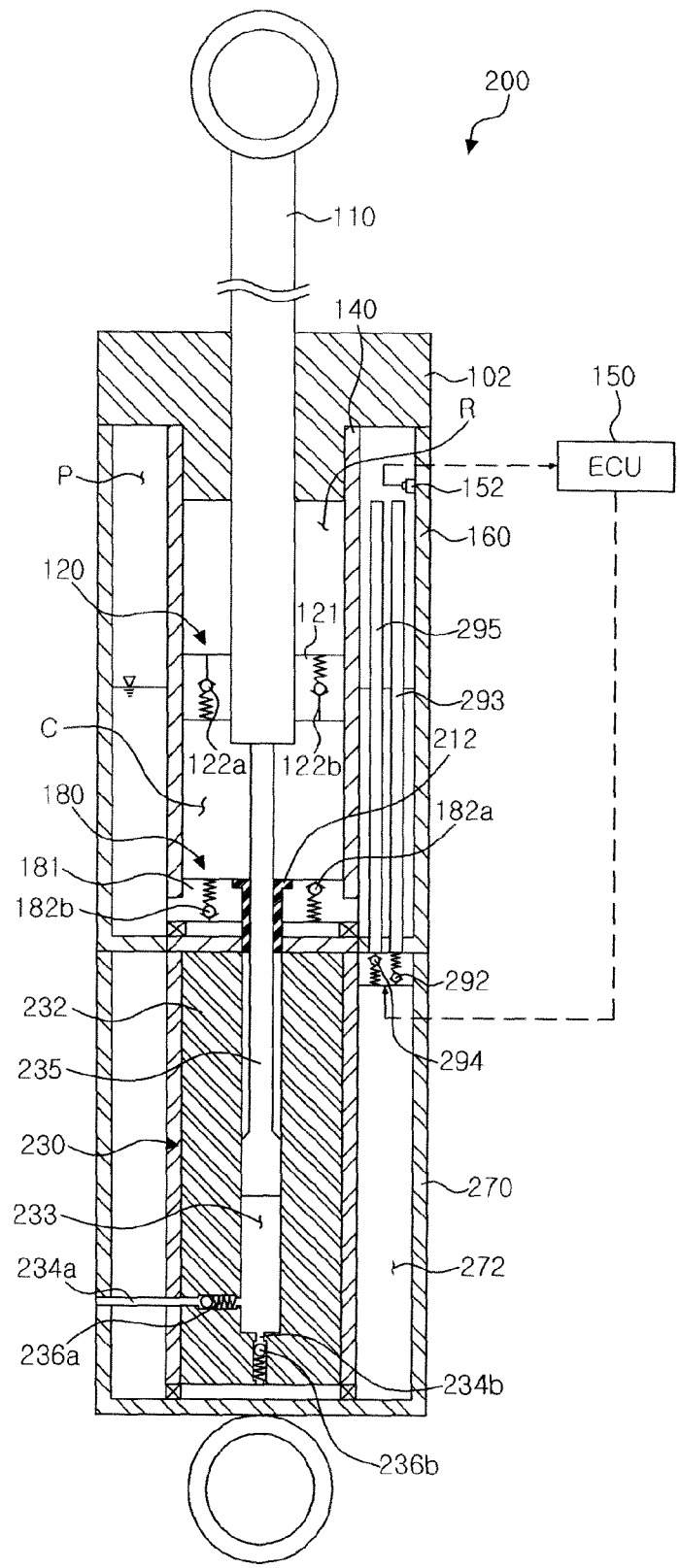
FIG. 8 is a view illustrating the control concept of the shock absorber according to the second embodiment of the present invention.

Various methods for supplying the gas in the high pressure chamber 172 of the high pressure tank 170 to the reservoir chamber P and recovering the gas can be utilized. However, an electronic control method as shown in FIG. 4 is employed in this embodiment.

As described previously, the first and second valve elements 192 and 194 are provided in the bidirectional flow passages between the high pressure chamber 172 and the reservoir chamber P. As illustrated in FIG. 4, the first and second valve elements 192 and 194 (hereinafter, referred to as "electronic valve elements") may be configured to be controlled by an electronic control unit 150. To this end, the shock absorber 100 according to this embodiment further comprises a pressure sensor 152 for measuring the pressure in the reservoir chamber P, and the electronic control unit 150 controls the first and second electronic valves elements 192 and 194 according to the pressure information measured by the pressure sensor 152.

If the "lag" phenomenon occurs in the rebound stroke of the shock absorber, the electronic control unit 150 determines that the pressure in the reservoir chamber P measured through the pressure sensor 152 becomes lower than the predetermined reference value, and then opens the first electronic valve element 192 of the bidirectional valves, thereby supplying the reservoir chamber P with the high pressure gas in the high pressure chamber 172 of the high pressure tank 170. Since the internal pressure of the reservoir chamber P is already dropped according to the rebound stroke, only the opening itself of the first electronic valve element 192 makes it possible for the gas in the high pressure chamber 172 under a relative high pressure condition to be rapidly supplied into the reservoir chamber P under a relative low pressure condition. If the reservoir chamber P is replenished with the gas, the oil in the reservoir chamber P is supplied more rapidly to the compression chamber C through the second body flow passage of the body valve 180 that is opened by the second body valve element 182b. Accordingly, the "lag" phenomenon caused by the delay of the oil compensation can be inhibited.

Following the rebound stroke, on the compression stroke, the oil in the compression chamber C is recovered again into the reservoir chamber P via the first body flow passage of the body valve 180, so that the pressure in the reservoir chamber P is increased again. If the pressure in the reservoir chamber P measured by means of the pressure sensor 152 becomes higher than the predetermined reference value, the electronic control unit 150 controls to open the second electronic valve element 194 of the bidirectional valves. At this time, since the pressure of the reservoir chamber P is higher than that of the high pressure chamber 172, only the opening itself of the second electronic valve element 194 makes it possible for the gas in the reservoir chamber P to be recovered into the high pressure chamber 172.

It has been described in the aforementioned embodiment that the shock absorber 100 comprises the pressure sensor 152 and the electronic control unit 150, and on the basis of the pressure information in the reservoir chamber P measured by means of the pressure sensor 152, the electronic control unit 150 controls the bidirectional valves including the first and second electronic valve elements 192 and 194, to open and close the bidirectional flow passage between the reservoir chamber P and the high pressure chamber 172.

However, if the first and second electronic valve elements 192 and 194 constituting the bidirectional valves consist of first and second check valves which are automatically opened by change of gas pressure, the pressure sensor 152 and the electronic control unit 150 can be omitted, which is also included in the scope of the present invention. However, in order to supply and recover gas accurately and reliably between the high pressure chamber and the reservoir chamber, the structure for electronically controlling the bidirectional valves may be used. If the pressure sensor and the electronic control unit are not used, the gas pressure for opening the bidirectional valves should be considered in addition to the pressure difference allowing gas to flow between the reservoir chamber and the high pressure chamber.

FIGS. 5 to 8 exemplarily show a shock absorber 200 according to a second embodiment of the present invention. As shown in the figures, in the shock absorber 200 according to the second embodiment, a high pressure chamber 272 is provided in a lower side of the outer shell 160. That is, in the second embodiment, the high pressure chamber 272 of a high pressure tank 270 is positioned below the reservoir chamber P.

In the second embodiment of the present invention, a self pumping unit 230 is provided with a pumping rod 235 coaxially connected to the lower end of the piston rod 110. The pumping rod 235 hermetically and slidably penetrates lower ends of the body valve 180 and the inner shell 140. A lower rod guide 212 is provided at lower ends of the body valve 180 and the inner shell 140, and the pumping rod 235 slidably penetrates the lower rod guide 212.

In addition, the self pumping unit 230 comprises a pumping room 233 which slidably receives the pumping rod 235 and allows the pumping rod to move reciprocatively in the pumping room. The pumping room 233 is formed in a pumping block 232 provided in the high pressure tank 270. Accordingly, the pumping room 233 is positioned below the compression chamber C.

Moreover, the self pumping unit 230 comprises first and second pumping flow passages 234a and 234b formed in the pumping block 232 so that the self pumping unit 230 communicates with the external air and the high pressure chamber 272 of the high pressure tank 270 in a state where the self pumping unit is connected to the pumping room 233. In addition, first and second check valves 236a and 236b for pumping operation are provided in the first and second pumping flow passages 234a and 234b. The first and second check valves 236a and 236b operate according to the upward and downward movement of the pumping rod 235 to open the first and second pumping flow passages 234a and 234b in order.

Further, in the second embodiment of the present invention, connecting tubes 293 and 295 are connected to the first and second valve elements 292 and 294, respectively, and upper ends of the connecting tubes 293 and 295 are positioned in an upper portion of the reservoir chamber P. Accordingly, the high pressure chamber 272 is in air communication with the upper portion of the reservoir chamber P.

The elements of the shock absorber of the second embodiment except for the self pumping unit and the high pressure tank are the same as those of the first embodiment, so that like reference numerals are used to designate like elements. The descriptions on the same elements will be omitted.

In the meantime, it is possible to adjust the height of a vehicle by using the self pumping unit according to the first and second embodiments of the present invention.

A shock absorber 300 according to the third embodiment of the present invention is configured such that the compressed gas obtained by the aforementioned self pumping unit is used to adjust the height of the vehicle.

FIGS. 9 to 12 exemplarily show the shock absorber 300 according to the third embodiment of the present invention. In the shock absorber 300 according to the third embodiment, as shown in the figures, a housing 310 is provided to slidably overlap with a lower outer circumference surface of the high pressure tank 170. The housing 310 has an open upper portion and is provided with expandable tubes 320 therein. Although three expandable tubes 320 stacked one above another are exemplarily illustrated in this embodiment, one or two or more than three expandable tubes 320 may be provided. In addition, like the first embodiment, the high pressure chamber 172 of the shock absorber 300 according to the third embodiment can be installed on an outer circumference surface of the outer shell 160.

The figures exemplarily show that the expandable tubes 320 are spaced apart from each other in order to clearly illustrate the expandable tubes. It can however be found that the expandable tubes 320 are substantially in contact with each other actually.

The shock absorber 300 increases the height of the vehicle in such a manner that the high pressure gas stored in the high pressure chamber 172 of the high pressure tank 170 is supplied to the expandable tubes 320 to expand the expandable tubes 320, which causes the housing 310 to slide downward with respect to the high pressure tank 170. On the contrary, the shock absorber 300 decreases the height of the vehicle in such a manner that the high pressure gas stored in the expandable tubes 320 is discharged to the high pressure chamber 172 to contract the expandable tubes 320, which causes the housing 310 to slide upward with respect to the high pressure tank 170. To this end, the bidirectional flow passages are formed between the high pressure chamber 172 and the expandable tubes 320. These bidirectional flow passages are selectively opened and closed by bidirectional valves 330. The bidirectional valves 330 selectively open the flow passage having the directionality from the high pressure chamber 172 to the expandable tubes 320 and the flow passage having the directionality from the expandable tubes 320 to the high pressure chamber 172. One ends of flexible connecting tubes 340 are connected to the bidirectional valves 330, respectively. The other ends of the flexible connecting tubes 340 are connected to the expandable tubes 320, respectively.

In order to prevent the housing 310 from escaping from the high pressure tank 170 when the housing 310 slides upward and downward with respect to the high pressure tank 170, stoppers 171 are formed on the outer circumference surface of the high pressure tank 170, and engaging pieces 311 to be caught to the stoppers 171 of the high pressure tank 170 are formed on the open upper end of the housing 310.

An exhaust valve 350 is installed to the high pressure tank 170 to selectively discharge the gas in the high pressure chamber 172 to the outside when the pressure in the high pressure chamber becomes higher than a predetermined value or a user intentionally discharges gas out of the high pressure tank.

Figure 12:
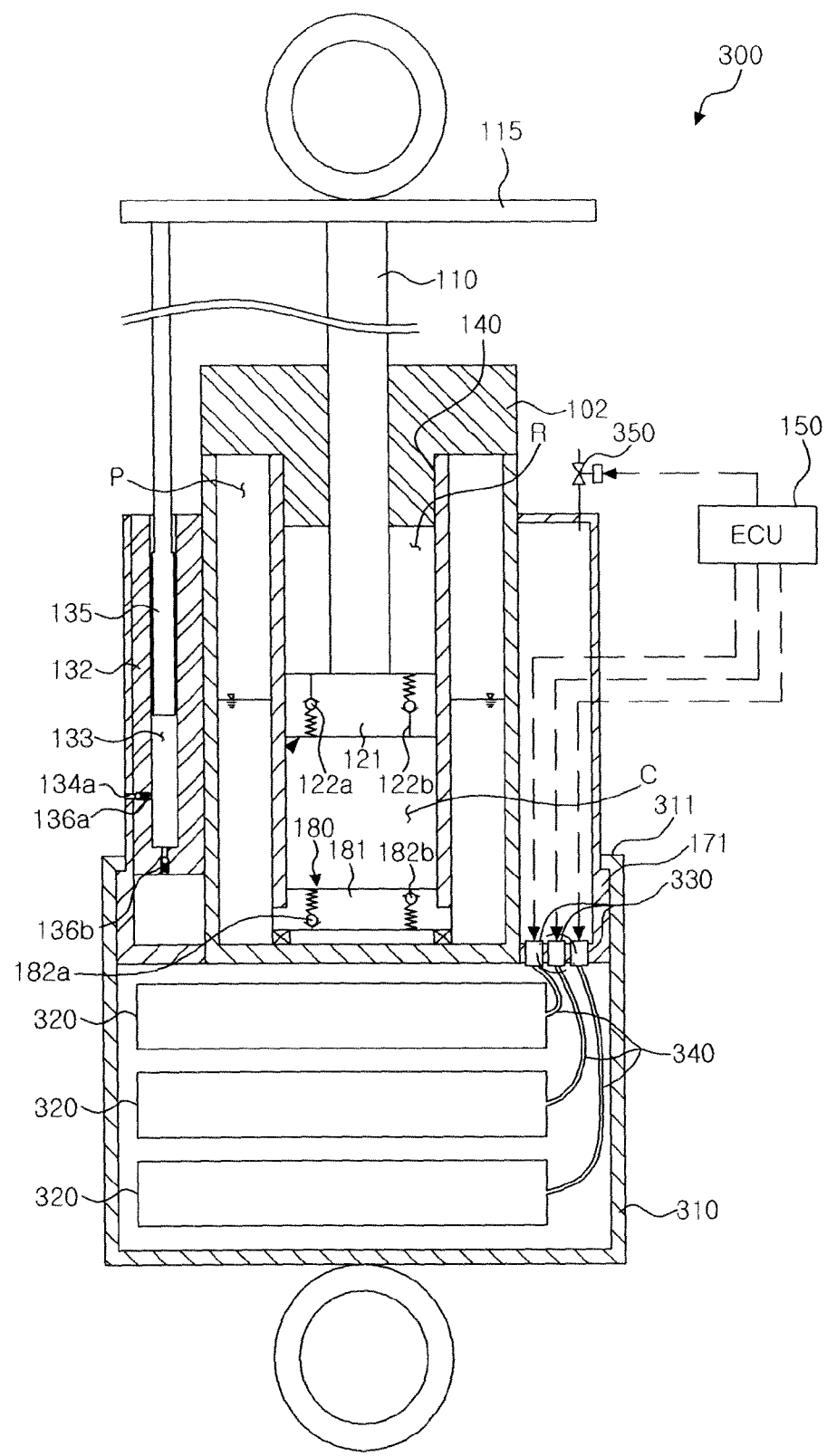
FIG. 12 is a view illustrating the control concept of the shock absorber according to the third embodiment of the present invention.

Various methods for supplying the gas in the high pressure chamber 172 of the high pressure tank 170 to the expandable tubes 320 and recovering the gas can be utilized. However, an electronic control method as shown in FIG. 12 is employed in this embodiment.

As described previously, the bidirectional valves 330 are provided in the bidirectional flow passages between the high pressure chamber 172 and the expandable tubes 320. At this time, the bidirectional valves 330 may include first and second valve elements 332 and 334 (hereinafter, referred to as "electronic valve elements") and be configured such that the electronic valve elements are controlled by the electronic control unit 150. To this end, the information on a driving status of the vehicle is provided to the electronic control unit 150, which controls the bidirectional valve 330 and the exhaust valve 350 according to the information on the driving status of the vehicle.

Figure 9:
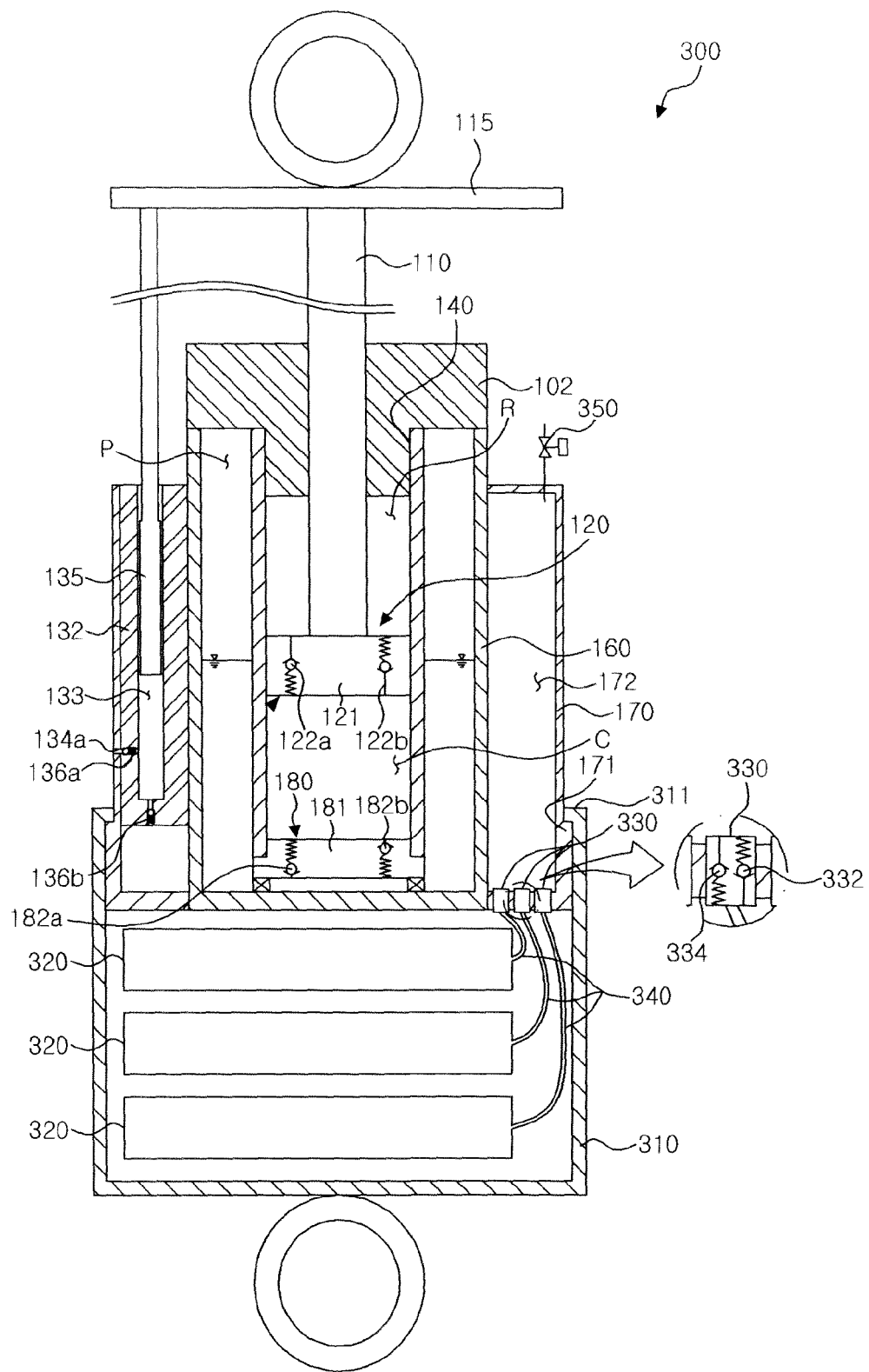
FIG. 9 is a view schematically showing a shock absorber according to a third embodiment of the present invention.

For example, when the vehicle is straightly driven at a low speed, the electronic control unit 150 opens all the first electronic valve elements 332 of the three bidirectional valves 330 according to the information on the vehicle driving status to supply three expandable tubes 320 with the high pressure gas in the high pressure chamber 172 of the high pressure tank 170, so that all the three expandable tubes 320 are expanded as shown in FIG. 9. Accordingly, the housing 310 slides downward with respect to the high pressure tank 170 to increase the height of the vehicle.

Figure 10:
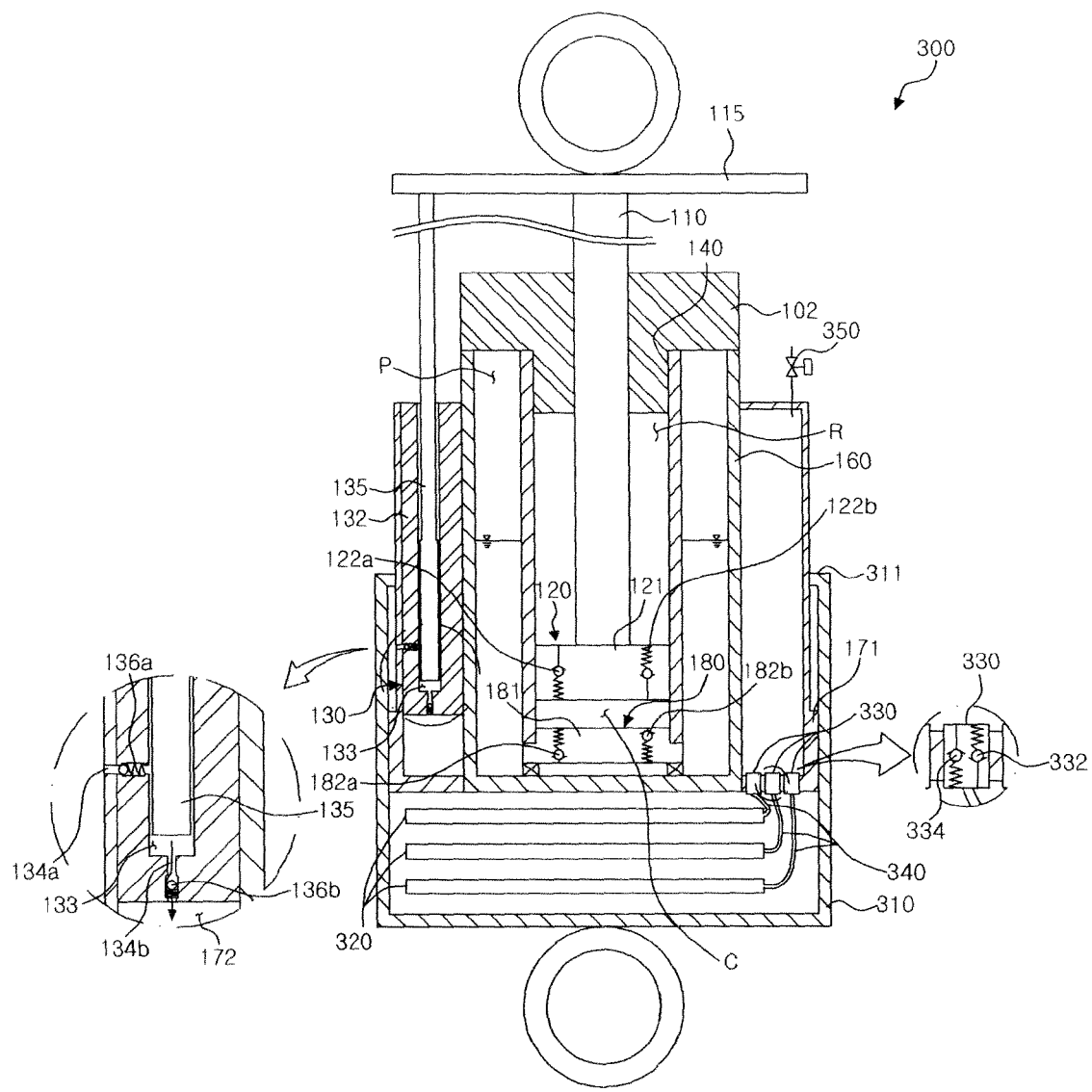
FIGS. 10 and 11 are views illustrating the operation of the shock absorber according to the third embodiment of the present invention.

In addition, for example, when the vehicle is straightly driven at a normal speed, the electronic control unit 150 opens two of the electronic valve elements 332 of the three bidirectional valves 330 and opens the exhaust valve 350 according to the information on the vehicle driving status to discharge the high pressure gas in two of three expandable tubes 320 to the outside through the high pressure chamber 172 of the high pressure tank 170, so that only one of three expandable tubes 320 is expanded and the two thereof are retracted, as shown in FIG. 10. Accordingly, the housing 310 slides upward with respect to the high pressure tank 170 to adjust the height of the vehicle to an intermediate value.

Figure 11:
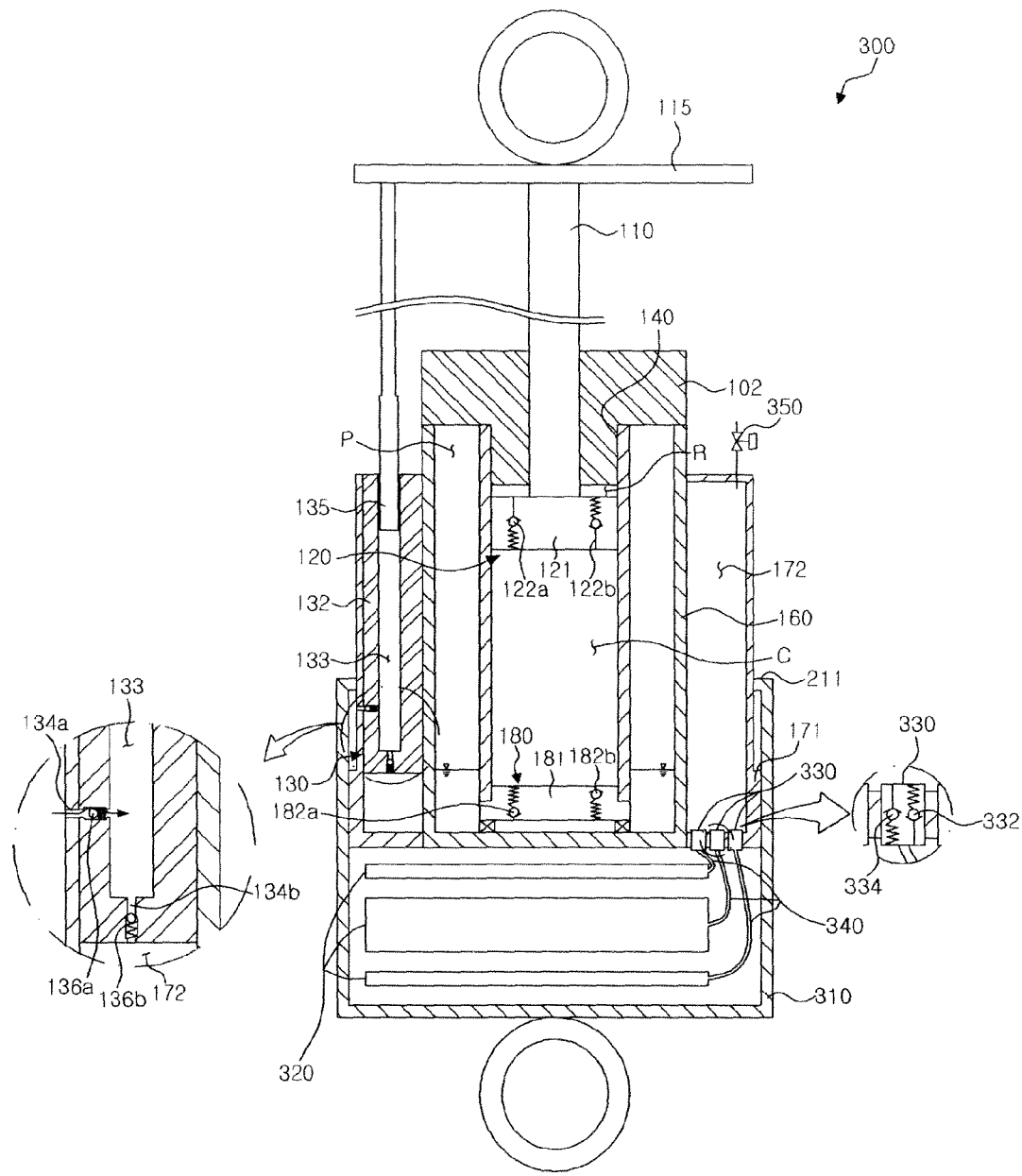

Further, for example, when the vehicle is driven at a high speed or corners, the electronic control unit 150 opens all the first electronic valve elements 332 of the three bidirectional valves 330 and opens the exhaust valve 350 according to the information on the vehicle driving status to discharge the high pressure gas in all the three expandable tubes 320 to the outside through the high pressure chamber 172 of the high pressure tank 170, so that all the three expandable tubes 320 are retracted as shown in FIG. 11. Accordingly, the housing 310 slides upward with respect to the high pressure tank 170 to reduce the height of the vehicle.

The elements of the shock absorber of the third embodiment except for the configuration for adjusting the height of a vehicle are the same as those of the first embodiment, so that like reference numerals are used to designate like elements. The descriptions on the same elements will be omitted.

According to the embodiments of the present invention, a "lag" phenomenon in which oil flows with delay from a reservoir chamber to a compression chamber during a rebound stroke of a shock absorber can be substantially prevented, thereby inhibiting a distortion of damping force in a compression stroke caused by the "lag" phenomenon. Also, the shock absorber according to the embodiments of the present invention can prevent a distortion of the damping force caused by a gas loss in the reservoir chamber in that the gas loss in the reservoir chamber can be supplemented according to an increase of usage period. In addition, the shock absorber according to the embodiments of the present invention has an advantage in that the compressed gas obtained itself by the upward and downward movement of a piston rod can be utilized for adjusting the height of a vehicle.

Although the present invention has been described with reference to the specific embodiments thereof, various modifications, changes and alterations can be made thereto within the spirit of the present invention and the scope of the appended claims. Therefore, the aforementioned descriptions and the drawings should be interpreted as not the limitation of the spirit of the present invention but the illustrations thereof.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A shock absorber comprising:
    a piston rod;
    a piston valve coupled to one end of the piston rod;
    an inner shell having an inner space configured to receive the piston valve, the piston valve being operable to reciprocate between rebound and compression strokes, the inner space of the inner shell being divided into a rebound chamber and a compression chamber by the piston valve;
    an outer shell positioned outside of the inner shell and having a reservoir chamber, the reservoir chamber being configured to supply oil to the compression chamber in the rebound stroke and to recover oil in the compression stroke;
    a high pressure tank having a high pressure chamber installed outside of the outer shell; and
    a self pumping unit for sucking gas external to said self pumping unit and for pumping the sucked gas into the high pressure chamber using, via a mechanical connection to the piston rod, energy generated by reciprocating movement of the piston rod,
    wherein the high pressure chamber is provided on a lower side of the outer shell, and wherein the self pumping unit includes:
- a pumping rod connected to the piston rod and moving together with the piston rod;
- a pumping room being in fluid communication with the atmosphere and the high pressure chamber through first and second pumping flow passages, respectively, the pumping room being provided in the high pressure tank to allow the pumping rod to move reciprocatively in the pumping room; and
- first and second check valves for opening the first pumping flow passage and the second pumping flow passage, respectively, in order, according to the retreat and advance of the pumping rod, to suck the external gas into the pumping room and supply the sucked gas into the high pressure chamber.

2. The shock absorber as claimed in claim 1 wherein the inner shell has a body valve provided at a lower end thereof, the body valve having a flow passage for connecting the compression chamber and the reservoir chamber, and the pumping rod is coupled to a lower end of the piston rod coaxially therewith so that the pumping rod hermetically and slidably passes through the body valve and the lower end of the inner shell.

3. The shock absorber as claimed in claim 1 wherein the high pressure chamber is in fluid communication with an upper portion of the reservoir chamber via a connecting tube.

4. The shock absorber as claimed in claim 1, wherein the high pressure chamber of the high pressure tank is in fluid communication with the reservoir chamber bidirectionally through valves which are selectively opened.

5. The shock absorber as claimed in claim 4, wherein the valves are installed to open any one of flow passages according to pressure change in the reservoir chamber caused by the rebound and compression strokes of the piston rod.

\* \* \* \* \*